Inventor
Arthur E. Raymond
By
W. B. Churcher
Attorney

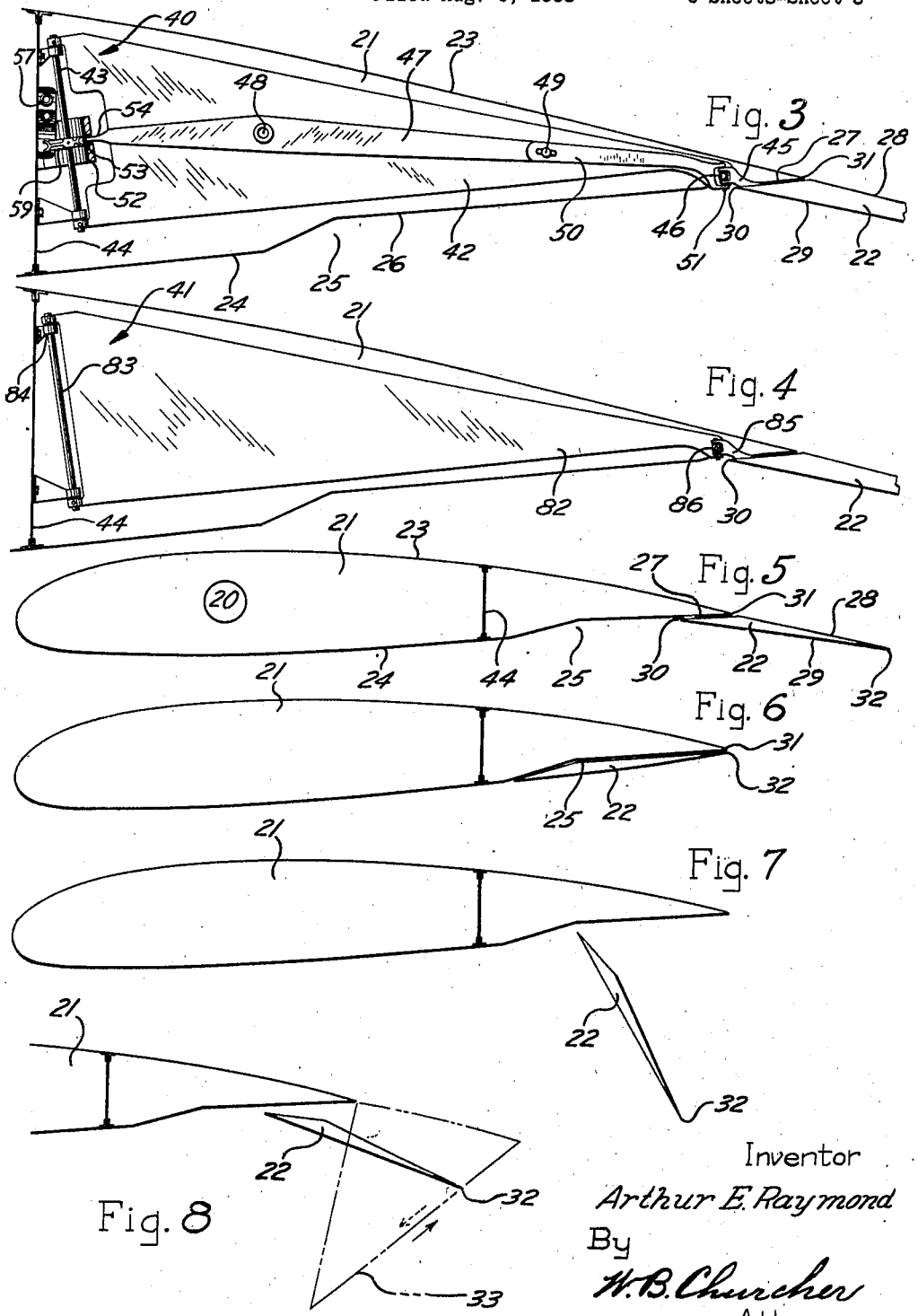

April 7, 1942.    A. E. RAYMOND    2,278,562
AIRPLANE
Filed Aug. 3, 1938    6 Sheets-Sheet 5

Inventor
Arthur E. Raymond
By
W. B. Churcher
Attorney

April 7, 1942.  A. E. RAYMOND  2,278,562
AIRPLANE
Filed Aug. 3, 1938  6 Sheets-Sheet 6

Inventor
Arthur E. Raymond
By
W. B. Churcher
Attorney

Patented Apr. 7, 1942

2,278,562

UNITED STATES PATENT OFFICE 2,278,562

AIRPLANE

Arthur E. Raymond, West Los Angeles, Calif., assignor to Douglas Aircraft Company, Inc., Santa Monica, Calif.

Application August 3, 1938, Serial No. 222,875

7 Claims. (Cl. 244—42)

The subject invention pertains to airplanes with particular reference to modifications of the lift and drag characteristics of wings.

The invention provides a wing the rear portion of which is differentially positionable fore and aft relative to the forward portion throughout a reversible cycle wherein the locus of the trailing edge of the rear portion is substantially triangular and the sequence of positions includes the trailing attitude, a position in nested relation with the bottom surface of the forward portion, and an angularly subtending attitude relative to the forward portion, each of which positions corresponds to one of the vertices of the triangular locus; whereby, positioning the rear portion in the trailing attitude provides high lift for take-off, retracting the portion into nested relation with the forward portion reduces the drag for cruising flight, repositioning the portion to the trailing attitude increases the lift coefficient for approach to a landing, and positioning the portion in subtending attitude increases the drag for landing. Moreover, the operating cycle constrains the rear portion to move progressively from one position to another with a minimum time lag, thereby precluding the attainment of intermediate attitudes wherein the aerodynamic effect would be not only undesirable but can create flight hazards of considerable magnitude.

Therefore, the principal objectives of the subject invention are to improve the take-off and landing characteristics of an airplane; to improve maneuverability; to increase the climbing angle within a restricted area; to maneuver from a steep glide into a high climbing angle within a restricted area in order to facilitate the resumption of normal flight under emergency landing conditions; and to maneuver from a high climbing angle into a steep glide within a restricted area in order to facilitate the execution of a forced landing under emergency take-off conditions.

The foregoing statements and objectives point out the important and general objects of my invention, which objects can be attained by the embodiments chosen for purposes of illustration and as hereinafter described and claimed.

In the drawings:

Fig. 3 is a fragmentary sectional view on the line 3—3 of Figure 1.

Fig. 4 is a fragmentary sectional view on the line 4—4 of Figure 1.

Fig. 5 is a diagrammatic sectional view of the wing showing the rear portion in the trailing attitude.

Fig. 6 is a diagrammatic sectional view showing the rear portion in the retracted position.

Fig. 7 is a diagrammatic sectional view showing the rear portion in the subtending attitude.

Fig. 8 is a diagrammatic sectional view showing the rear portion in an attitude intermediate the subtending and the trailing attitudes and showing by broken line the locus of a point on the trailing edge.

Figure 1:
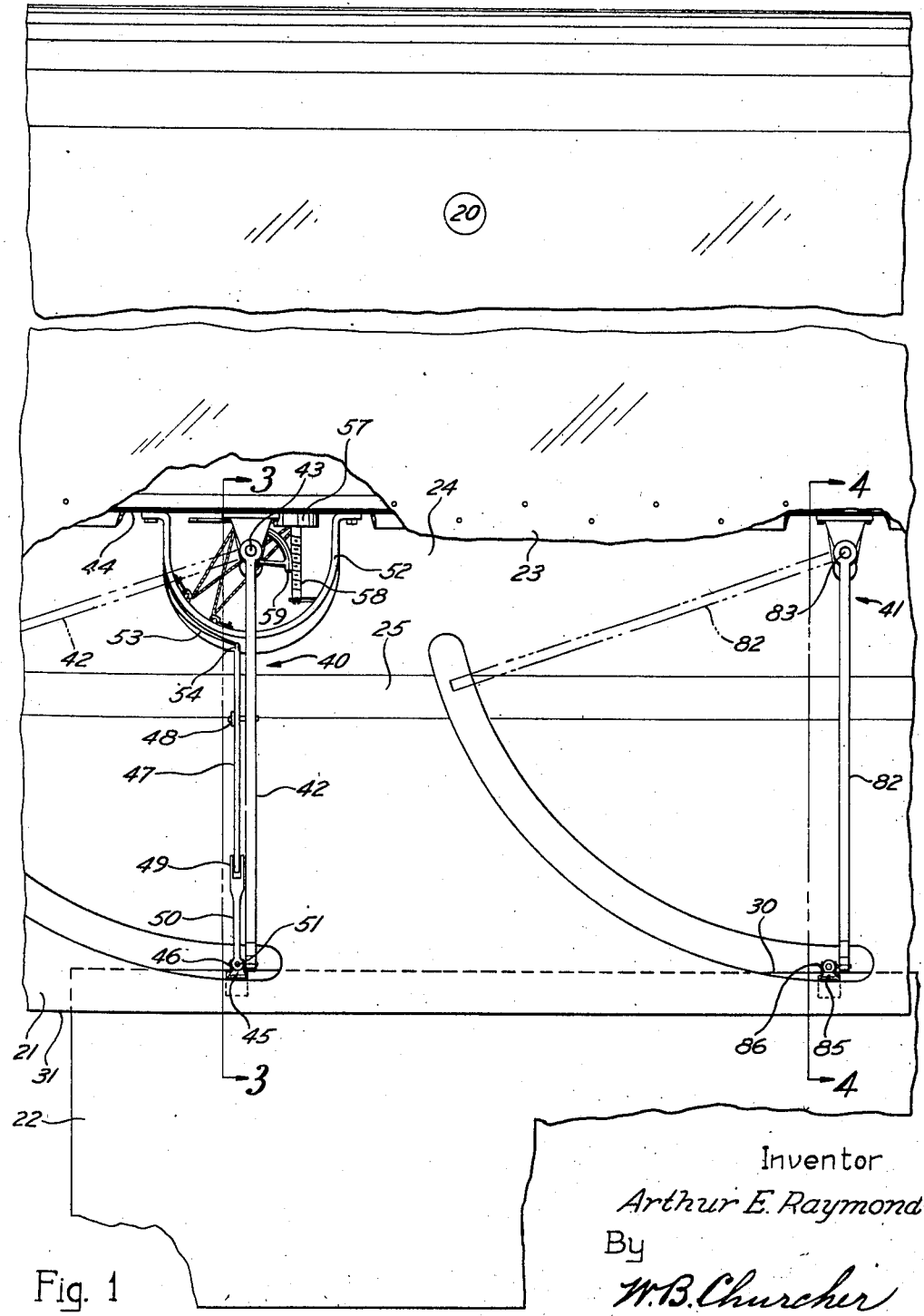
Fig. 1 is a fragmentary top plan view of a wing incorporating one embodiment of the invention.

An embodiment of the invention comprises an airplane wing 20 including a forward portion 21 and an adjustable rear portion 22; the forward portion having an upper surface 23, a lower surface 24, and a recess 25 which may be provided with a surface 26; and the rear portion having a leading edge surface 27, an upper surface 28, and a lower surface 29. The rear portion is pivotally supported adjacent to the leading edge 30 in a manner adapted for operation throughout the following cycle as well as throughout the reverse cycle to that described: retraction from the take-off trailing attitude, wherein the leading edge surface is adjacent to the trailing edge 31 of the forward portion and surface 28 is substantially co-extensive with cambered surface 23 as shown in Figure 5, into nested relation with recess 25 as shown in Figure 6 for cruising flight; tilting from the retracted position downwardly to a subtending attitude as shown in Figure 7 for landing; and swinging directly from the subtending attitude rearwardly-upwardly to the trailing attitude; whereby the locus of any point on the trailing edge 32 of the rear portion is substantially triangular as illustrated by broken line 33 in Figure 8.

It will be apparent to persons skilled in the art that the operating cycle constrains rear portion 22 to move progressively, both mechanically and aerodynamically, from one position to another in either direction. This feature is of particular importance when an emergency requires rapid maneuvering of the airplane from one condition of flight to another. For example, in an approaching for a landing the pilot finds he is overshooting the field, he can adjust the rear portion directly from the high drag subtending attitude to the high lift trailing attitude enabling him to maneuver the airplane from a steep glide into a high climbing angle within a restricted area; or, if in taking off an engine failure necessitates a forced landing, the pilot can adjust the rear portion directly from the trailing attitude to the subtending attitude, and, consequently, quickly maneuver the airplane from a high climbing angle to a steep glide. The benefits derived from the progressive operation of the rear portion, however, are not limited to emergency conditions. For instance, the cycle provides for a more gradual approach to a landing than is obtainable with a wing flap or auxiliary airfoil having the characteristic of materially increasing the drag immediately preceding attainment of the landing attitude.

The supporting and operating means for rear portion 22 in one of the embodiments of the invention chosen for purposes of illustration may comprise either a plurality of the mechanisms broadly designated as 40, or one or more of mechanisms 40 together with one or more of the mechanisms broadly designated as 41. Mechanism 40 is adapted for supporting the rear portion as well as for reversibly operating it through the cycle while mechanism 41 is only adapted for supporting the portion.

Figure 2:
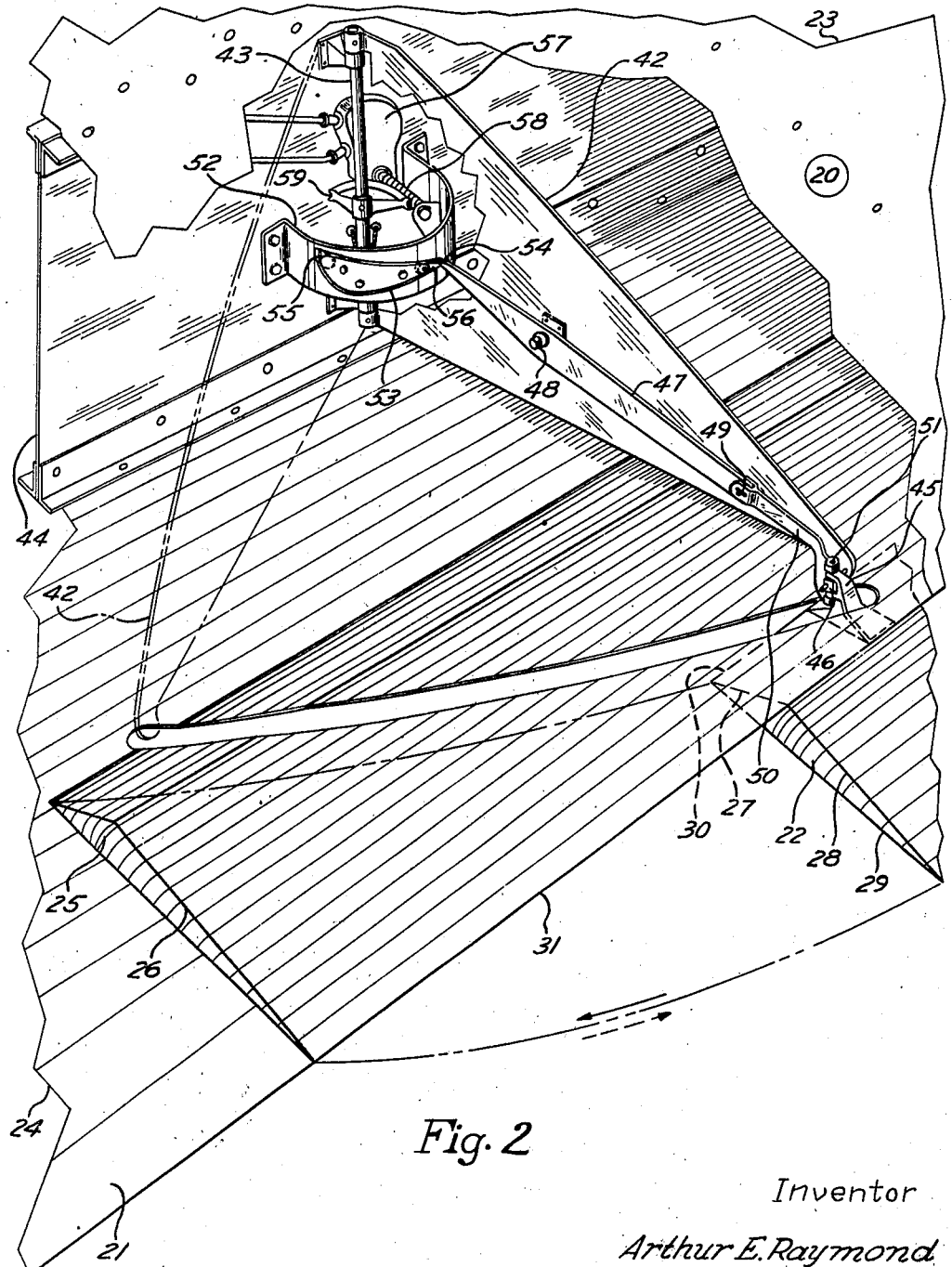
Fig. 2 is a fragmentary isometric view of the wing.
Figure 9:
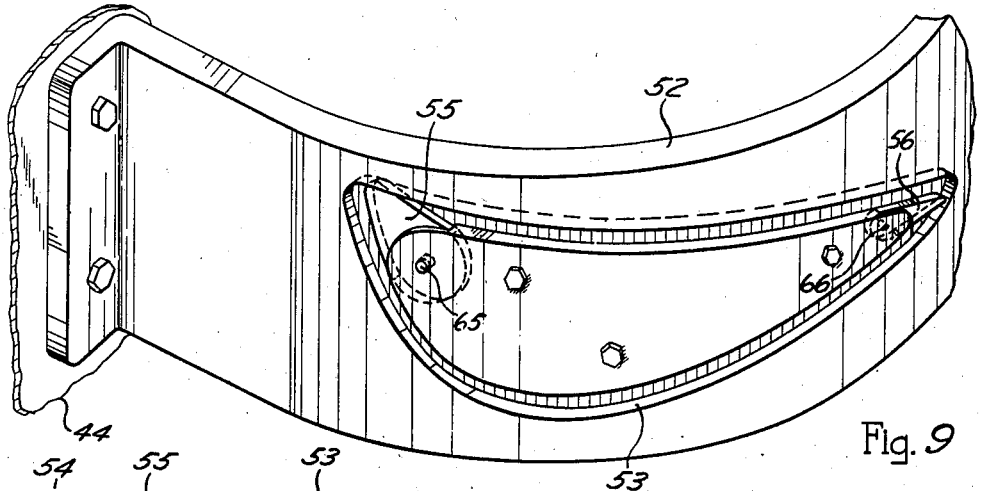
Fig. 9 is a fragmentary isometric view of the cam member indicated at 52 in Figure 2.
Figure 10:
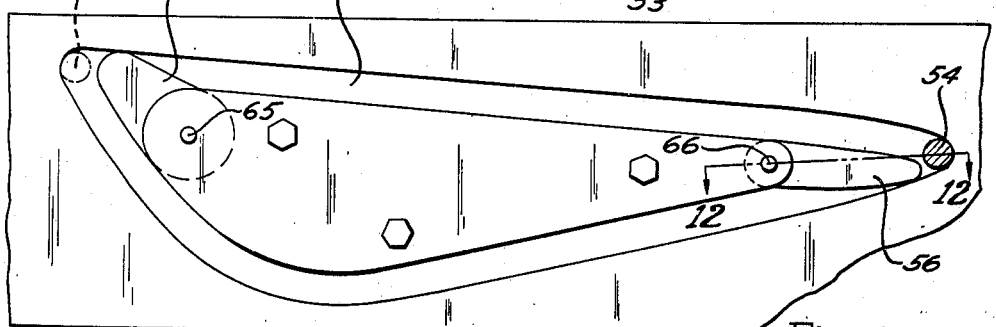
Fig. 10 is a diagrammatic view of the cam member showing the switches indicated at 55—56 biased for operation of the rear portion through the cycle in one direction.
Figure 11:
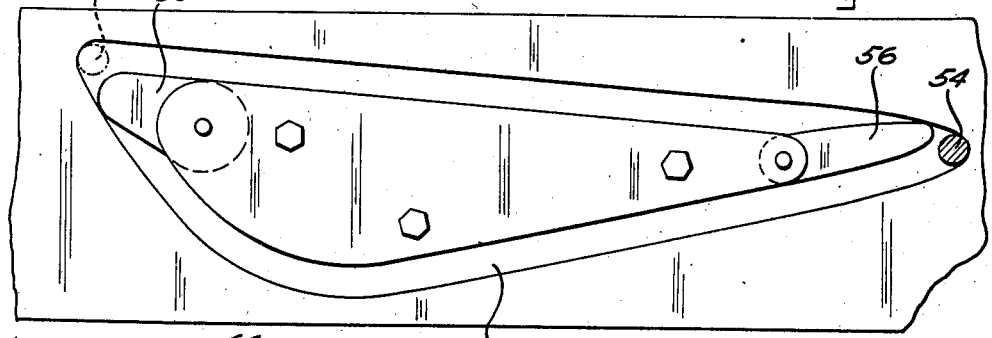
Fig. 11 is a view similar to Figure 10 but showing the switches biased for operation of the rear portion through the cycle in the opposite direction.
Figure 12:
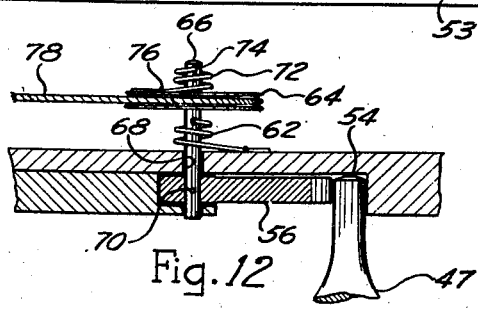
Fig. 12 is a section on the line 12—12 of Figure 10.
Figure 13:
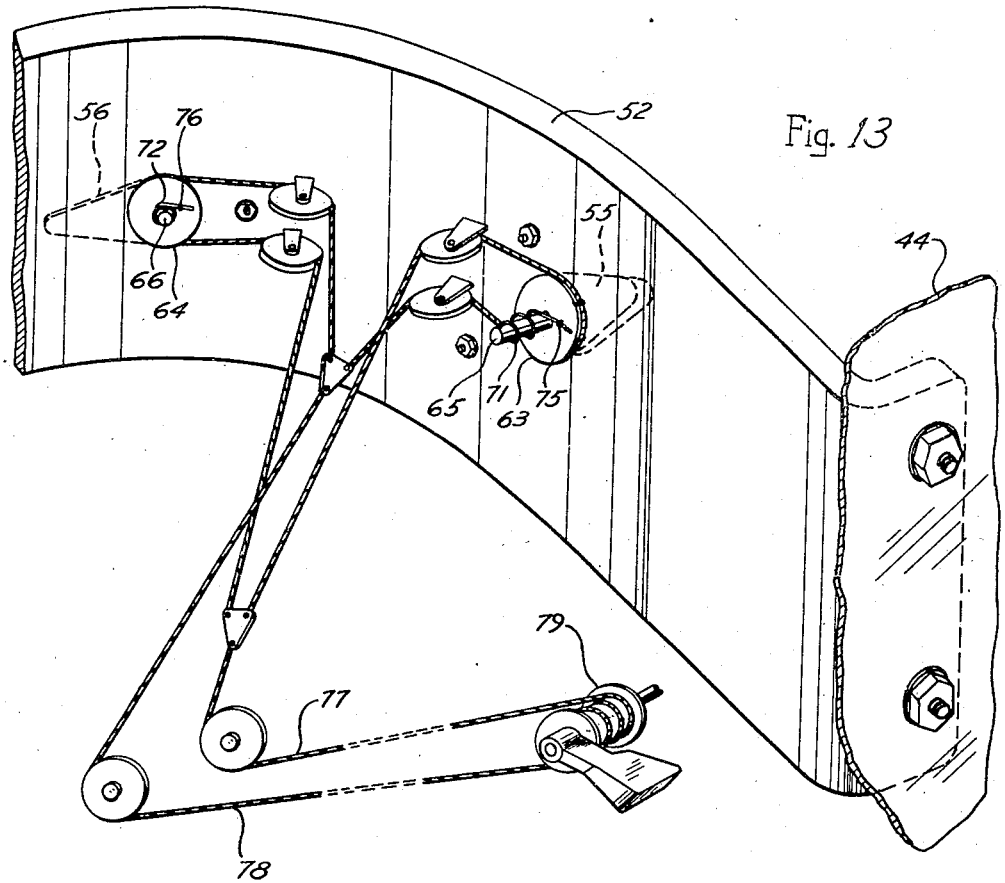
Fig. 13 is a fragmentary isometric view of cam member 52 showing the switch reversing mechanism more or less diagrammatically.
Figure 14:
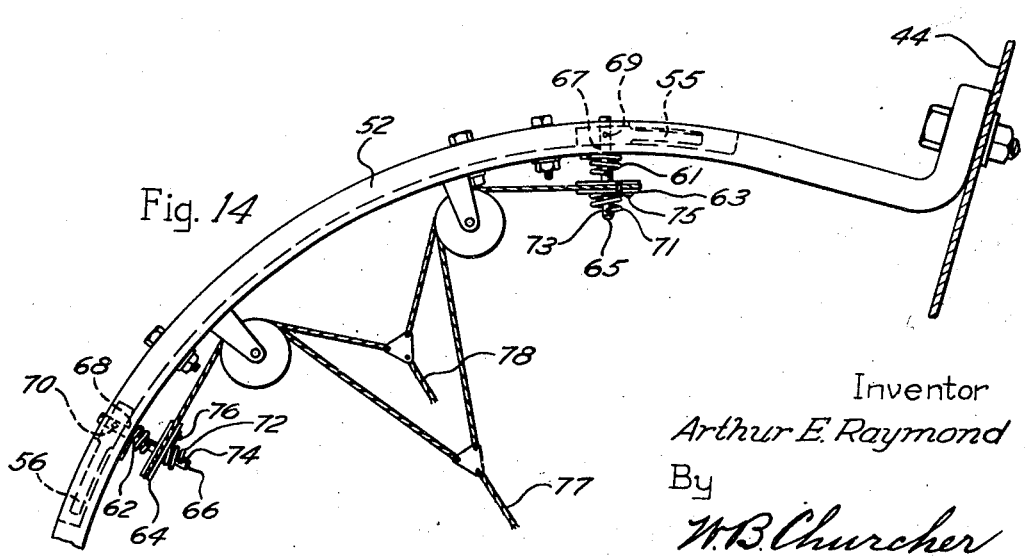
Fig. 14 is a fragmentary top plan view of the cam member.

Mechanism 40 is shown in Figures 1, 2, and 3 and comprises: a cantilever 42 attached to a rock shaft 43 that is pivotally supported by the structure of forward portion 21, as, for instance, by spar 44; a horn 45 attached to the rear portion adjacent leading edge 30 and connected to the cantilever through a universal joint 46; a lever 47 pivotally mounted on the cantilever at 48 and operably connected at 49 to an arm 50 that is pivotally connected to the horn at 51; an arcuately formed member 52 mounted on spar 44, the member having a reentrant groove or slot 53 defining a cam adapted to guide end 54 of the lever and resiliently biased switches 55—56 determining the directional continuity of the groove; and pilot operable or motor operable and pilot controllable means to drive the mechanism, which means may consist, for example, of a reversible motor 57 operably engaging an aerodynamically irreversible worm and gear sector 58—59 for swinging the cantilever in a generally fore and aft direction. Pilot operable means to reverse the biased positions of switches 55 and 56 and thereby control the direction in which rear wing portion 22 passes through the cycle is shown in Figures 12, 13, and 14. Normally the switches are resiliently biased to the positions shown in Figure 10 by springs 61—62. The reversing means illustrated comprises pulleys 63—64 pivotally mounted on shafts 65—66, the shafts being journaled to member 52 at 67—68 and connected to the switches at 69—70; springs 71—72 attached to the shafts at 73—74 and to the pulleys at 75—76; and means for rotating the pulleys to tension the springs and thereby pivot the switches to the reversed positions shown in Figure 11, the means consisting of cables 77—78 carried by the required number of pulleys to an operating drum 79 preferably located in the cockpit of the airplane for convenient operation by the pilot.

Mechanism 41 is shown in Figures 1 and 4 and comprises a cantilever 82 attached to a rock shaft 83 that is pivotally supported on spar 44 at 84, and a horn 85 attached to rear portion 22 adjacent leading edge 30 and connected to the cantilever through a universal joint 86.

Figure 15:
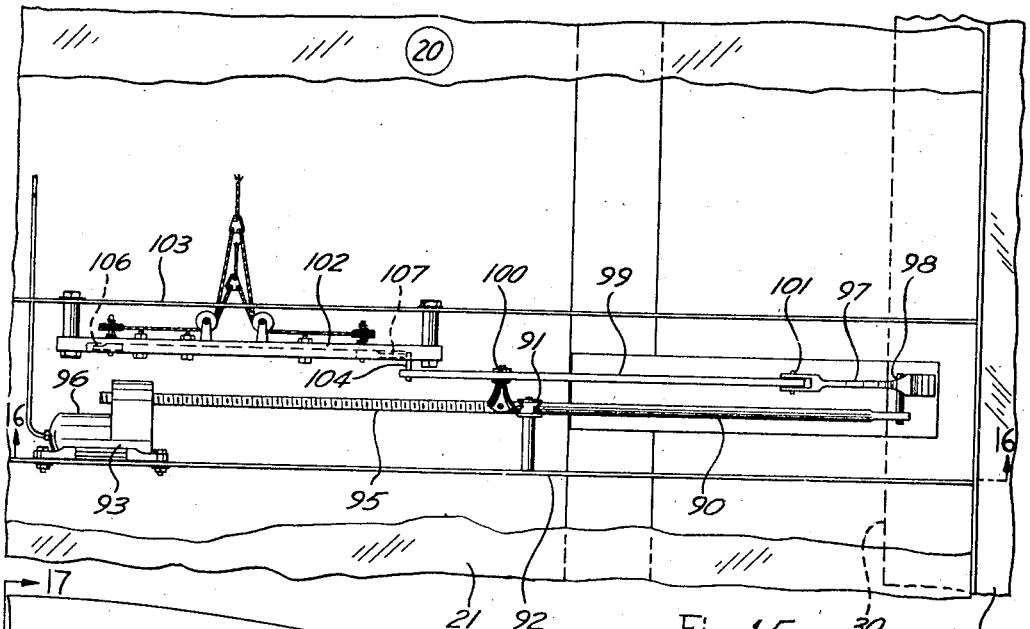
Fig. 15 is a fragmentary top plan view of a wing incorporating another embodiment of the invention.
Figure 16:
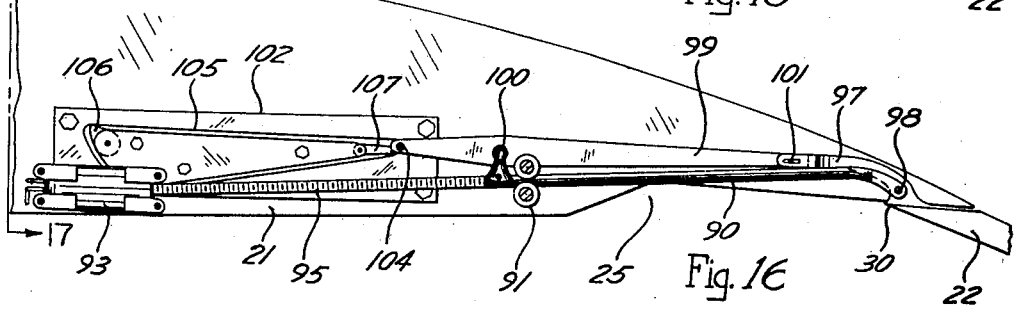
Fig. 16 is a fragmentary sectional view in the direction of arrows 16—16 in Figure 15.
Figure 17:
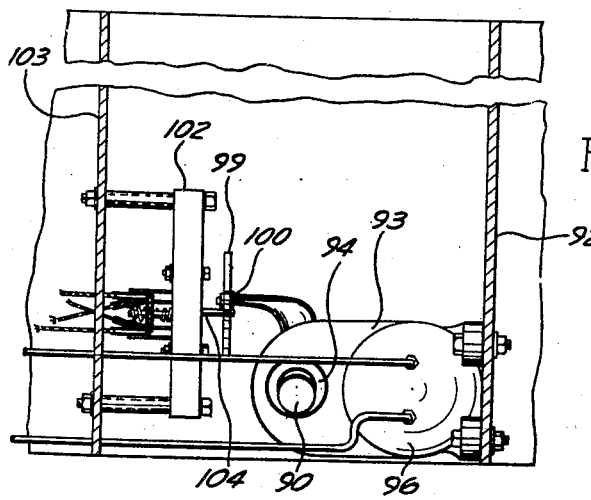
Fig. 17 is a sectional view on the line 17—17 of Figure 16.

Another embodiment of the supporting and operating means for rear portion 22 is shown in Figures 15, 16, and 17 and comprises: a bar 90 supported by pulleys 91 mounted to the structure of forward portion 21, as for instance, to a rib 92, and by an operating head 93 also mounted to rib 92, the head including a nut 94 operably engaging a threaded portion 95 of the bar and a pilot controllable motor 96 adapted to rotate the nut to thereby move the bar in a fore and aft direction; an arm 97 attached to the rear portion adjacent leading edge 30 and pivotally connected to the bar at 98; a lever 99 pivotally mounted on the bar at 100 and operably connected to the arm at 101; and a cam member 102 supported by a rib 103 and adapted to guide end 104 of the lever, the cam being defined by a reentrant groove or slot 105 into which end 104 extends and having resiliently biased switches 106 and 107 determining the directional continuity of the groove. It will be apparent to persons skilled in the art that the switch biasing and reversing means shown in Figures 12, 13, and 14 can be utilized with this embodiment of the supporting and operating means as well as with the previously described embodiment.

While I have herein shown and described particular embodiments of my invention, I wish it to be understood as including such other embodiments as fairly come within the scope of the appended claims.

I claim:

1. An airplane wing system including: a main wing having a forward portion and a rear portion, the rear portion being pivotally mounted and retractably connected to the forward portion; and means operative for positioning the said rear portion relative to the said forward portion throughout a reversible cycle in which the locus of the trailing edge of the rear portion is substantially triangular and three major positions comprise the trailing attitude, nesting with the bottom surface of the forward portion, and an angularly subtending attitude, each of which positions corresponds with one of the vertices of the triangular locus; the said means comprising primary means controllable by the pilot for retracting and for extending the rear portion, and secondary means responsive to operation of the primary means for pivoting the rear portion; the said primary means including a member pivotally connecting the said rear portion to the said forward portion and movable in a generally fore and aft direction to retract and to extend the rear portion; and the said secondary means comprising, in operative relation, a reentrant-groove cam affixed to the structure of the forward portion, a plurality of pilot operable switches determining the directional continuity of the reentrant portions of the groove, and a lever pivotally mounted for vertical oscillation upon the said connecting member, the lever engaging the groove and operatively connected for pivoting the rear portion in response to being oscillated by the cam.

2. An airplane wing system including: a main wing having a forward portion and a rear portion, the rear portion being pivotally mounted and retractably connected to the forward portion; and means operative for positioning the said rear portion relative to the said forward portion throughout a reversible cycle in which the locus of the trailing edge of the rear portion is substantially triangular and three major positions comprise the trailing attitude, nesting with the bottom surface of forward portion, and an angularly subtending attitude, each of which positions corresponds with one of the vertices of the triangular locus; the said means comprising primary means for retracting and for extending the rear portion, and secondary means responsive to operation of the primary means for pivoting the rear portion; the said primary means comprising a cantilever pivotally connecting the rear portion to the structure of the said forward portion and a pilot controllable motor operatively connected to the cantilever for moving the rear portion in a generally fore and aft direction; and the said secondary means comprising, in operative relation, a reentrant-groove cam affixed to the structure of the forward portion, a plurality of pilot operable switches determining the directional continuity of the reentrant portions of the groove, and a lever mounted for vertical oscillation upon the said cantilever, the lever engaging the groove and operatively connected for pivoting the rear portion in response to being oscillated by the cam.

3. An airplane wing system including: a main wing having a forward portion and a rear portion, the rear portion being pivotally mounted and retractably connected to the forward portion; and means operative for positioning the said rear portion throughout a cycle wherein the locus of the trailing edge of the rear portion is substantially triangular and three major positions comprise, in the order named, the trailing attitude, nesting with the bottom surface of the forward portion, and an angularly subtending attitude, each of which positions corresponds with one of the vertices of the triangular locus; the said means comprising primary means controllable by the pilot for retracting and for extending the rear portion, and secondary means responsive to operation of the primary means for pivoting the rear portion; the said primary means including a member pivotally connecting the said rear portion to the said forward portion and movable in a generally fore and aft direction to retract and to extend the rear portion; and the said secondary means comprising, in operative relation, a reentrant-groove cam affixed to the structure of the forward portion, a plurality of resiliently biased switches determining the directional continuity of the reentrant portions of the groove, and a lever pivotally mounted for vertical oscillation upon the said connecting member, the lever engaging the groove and operatively connected for pivoting the rear portion in response to being oscillated by the cam.

4. An airplane wing system including: a main wing having a forward portion and a rear portion, the rear portion being pivotally mounted and retractably connected to the forward portion; and means operative for positioning the said rear portion throughout a cycle wherein the locus of the trailing edge of the rear portion is substantially triangular and three major positions comprise, in the order named, the trailing attitude, nesting with the bottom surface of the forward portion, and an angularly subtending attitude, each of which positions corresponds with one of the vertices of the triangular locus; the said means comprising primary means for retracting and for extending the rear portion, and secondary means responsive to operation of the primary means for pivoting the rear portion; the said primary means comprising a cantilever connecting the rear portion to the structure of the said forward portion and a pilot controllable motor operatively connected to the cantilever for moving the rear portion in a generally fore and aft direction; and the said secondary means comprising, in operative relation, a reentrant-groove cam affixed to the structure of the forward portion, a plurality of resiliently biased switches determining the directional continuity of the reentrant portions of the groove, and a lever mounted for vertical oscillation upon the said cantilever, the lever engaging the groove and operatively connected for pivoting the rear portion in response to being oscillated by the cam.

5. An airplane wing system including: a main wing having a forward portion and a rear portion, the rear portion being pivotally mounted and retractably connected to the forward portion; and means operative for positioning the said rear portion throughout a cycle wherein the locus of the trailing edge of the rear portion is substantially triangular and three major positions comprise, in the order named, the trailing attitude, an angularly subtending attitude, and nesting with the bottom surface of the forward portion, each of which positions corresponds with one of the vertices of the triangular locus; the said means comprising primary means controllable by the pilot for retracting and for extending the rear portion, and secondary means responsive to operation of the primary means for pivoting the rear portion; the said primary means including a member pivotally connecting the said rear portion to the said forward portion and movable in a generally fore and aft direction to retract and to extend the rear portion; and the said secondary means comprising, in operative relation, a reentrant-groove cam affixed to the structure of the forward portion, a plurality of resiliently biased switches determining the directional continuity of the reentrant portions of the groove, and a lever pivotally mounted for vertical oscillation upon the said connecting member, the lever engaging the groove and operatively connected for pivoting the rear portion in response to being oscillated by the cam.

6. An airplane wing system including: a main wing having a forward portion and a rear portion, the rear portion being pivotally mounted and retractably connected to the forward portion; and means operative for positioning the said rear portion relative to the said forward portion throughout a cycle that provides three phases comprising retracting from the trailing attitude forwardly into nested relation with the bottom surface of the forward portion, tilting from the nested position downwardly to an angularly subtending attitude, and swinging from the subtending attitude rearwardly-upwardly to the trailing attitude; the said means comprising primary means controllable by the pilot for retracting and for extending the rear portion, and secondary means responsive to operation of the primary means for pivoting the rear portion; the said primary means including a member pivotally connecting the said rear portion to the said forward portion and movable in a generally fore and aft direction to retract and to extend the rear portion; and the said secondary means comprising, in operative relation, a reentrant-groove cam affixed to the structure of the forward portion, a plurality of resiliently biased switches determining the directional continuity of the reentrant portions of the groove, and a lever pivotally mounted for vertical oscillation upon the said connecting member, the lever engaging the groove and operatively connected for pivoting the rear portion in response to being oscillated by the cam.

7. An airplane wing system including: a main wing having a forward portion and a rear portion, the rear portion being pivotally mounted and retractably connected to the forward portion; and means operative for positioning the said rear portion relative to the said forward portion throughout a cycle that provides three phases comprising swinging from the trailing attitude forwardly-downwardly to an angularly subtending attitude, retracting from the subtending attitude into nested relation with the bottom surface of the forward portion, and extending from the nested position rearwardly to the trailing attitude; the said means comprising primary means controllable by the pilot for retracting and for extending the rear portion, and secondary means responsive to operation of the primary means for pivoting the rear portion; the said primary means including a member pivotally connecting the said rear portion to the said forward portion and movable in a generally fore and aft direction to retract and to extend the rear portion; and the said secondary means comprising, in operative relation, a reentrant-groove cam affixed to the structure of the forward portion, a plurality of resiliently biased switches determining the directional continuity of the reentrant portions of the groove, and a lever pivotally mounted for vertical oscillation upon the said connecting member, the lever engaging the groove and operatively connected for pivoting the rear portion in response to being oscillated by the cam.

ARTHUR E. RAYMOND.